United States Patent
Waggener

(10) Patent No.: US 8,539,640 B1
(45) Date of Patent: Sep. 24, 2013

(54) CASTER WHEEL LIFT AND BRAKE ASSEMBLY

(71) Applicant: Herbert A. Waggener, Chippewa Falls, WI (US)

(72) Inventor: Herbert A. Waggener, Chippewa Falls, WI (US)

(*) Notice: Subject to any disclaimer, the term of this patent is extended or adjusted under 35 U.S.C. 154(b) by 0 days.

(21) Appl. No.: 13/716,102

(22) Filed: Dec. 15, 2012

Related U.S. Application Data

(60) Provisional application No. 61/657,065, filed on Jun. 8, 2012.

(51) Int. Cl.
*B60B 33/00* (2006.01)

(52) U.S. Cl.
USPC .......................................... 16/18 B; 16/35 R

(58) Field of Classification Search
USPC ............. 16/18 B, 18 CG, 44, 35 D, 20, 35 R;
180/8.1, 8.2, 8.3, 8.5, 8.6, 8.7, 9.22, 9.3;
280/5.2, 5.24, 5.26, 47.17, 5.22, 47.29, 47.38,
280/47.22; 301/5.1, 5.22, 5.23
See application file for complete search history.

(56) References Cited

U.S. PATENT DOCUMENTS

| | | | | |
|---|---|---|---|---|
| 1,066,754 A | * | 7/1913 | Rison | 16/18 B |
| 1,105,379 A | * | 7/1914 | Schulze | 280/5.22 |
| 1,739,260 A | | 12/1929 | Roe | |
| 2,123,707 A | | 7/1938 | Bloch | |
| 2,701,005 A | | 2/1955 | Bennett et al. | |
| 3,239,872 A | * | 3/1966 | Kitrell | 16/18 R |
| 3,573,877 A | | 4/1971 | Locke | |
| 3,827,718 A | | 8/1974 | Curry | |
| 4,098,521 A | | 7/1978 | Ferguson et al. | |
| 4,132,423 A | | 1/1979 | Chant | |
| 4,248,445 A | | 2/1981 | Vassar | |
| 4,349,938 A | | 9/1982 | Fontana | |
| 4,432,425 A | * | 2/1984 | Nitzberg | 180/8.2 |
| 4,467,496 A | | 8/1984 | Gregg | |
| 4,534,433 A | | 8/1985 | Burbank et al. | |
| 4,674,757 A | * | 6/1987 | Martin | 280/5.26 |
| 4,747,611 A | | 5/1988 | Daugherty, Jr. | |
| 4,811,966 A | | 3/1989 | Singleton | |
| 5,228,709 A | | 7/1993 | Kao | |
| 5,482,326 A | | 1/1996 | Levi | |
| 5,562,172 A | | 10/1996 | Mick | |
| 5,899,469 A | | 5/1999 | Pinto et al. | |

(Continued)

FOREIGN PATENT DOCUMENTS

| | | |
|---|---|---|
| EP | 0127929 B | 2/1988 |
| GB | 2145983 A | 4/1985 |

(Continued)

*Primary Examiner* — Chuck Mah
(74) *Attorney, Agent, or Firm* — Tipton L. Randall

(57) ABSTRACT

A caster wheel assembly includes a vertical axis brake and barrier-traversing member. The caster shaft housing contains a stator surface adjacent the caster wheel assembly. The barrier-traversing member with barrier contact surface is biasedly fastened to the caster wheel assembly. A braking surface member is attached to the barrier-traversing member opposite the barrier contact surface and adjacent the stator surface. In operation, the moving caster wheel assembly first contacts an obstacle with the barrier contact surface of the barrier-traversing member. The encountered obstacle elevates the barrier-traversing member and attached braking surface member into contact with the stator surface of the caster shaft housing, thereby restraining rotation of the caster wheel assembly. Then, further forward movement of the rotation-restrained caster wheel assembly allows the barrier-traversing member to elevate the caster wheel, transfer load to the caster wheel, and thereby more easily traverse the obstacle.

20 Claims, 7 Drawing Sheets

(56) References Cited

U.S. PATENT DOCUMENTS

| | | | |
|---|---|---|---|
| 5,964,473 A | 10/1999 | Degonda et al. | |
| 6,129,165 A | 10/2000 | Schaffner et al. | |
| 6,325,398 B1 * | 12/2001 | Banzi | 280/250.1 |
| 6,371,502 B1 | 4/2002 | Howlett et al. | |
| 6,668,965 B2 | 12/2003 | Strong | |
| 6,712,369 B2 | 3/2004 | Wu | |
| 6,752,400 B2 | 6/2004 | Nakatsukosa et al. | |
| 7,036,185 B2 | 5/2006 | Morndal et al. | |
| 7,406,745 B2 | 8/2008 | Chou | |
| 7,540,504 B2 | 6/2009 | Ehman et al. | |
| 7,621,003 B2 | 11/2009 | Myers et al. | |
| 7,837,201 B2 | 11/2010 | Cheng et al. | |
| 7,866,430 B2 | 1/2011 | Kakinuma et al. | |
| 8,046,871 B2 | 11/2011 | Yamaguchi | |
| 8,079,606 B2 | 12/2011 | Dull et al. | |
| 2002/0074747 A1 * | 6/2002 | Heien | 280/5.26 |
| 2004/0135326 A1 * | 7/2004 | Palmers et al. | 280/5.2 |
| 2006/0267295 A1 * | 11/2006 | You | 280/5.28 |
| 2007/0056140 A1 | 3/2007 | Yamaguchi | |
| 2009/0172915 A1 | 7/2009 | Hunziker | |
| 2010/0162520 A1 | 7/2010 | Yamaguchi | |
| 2010/0175222 A1 | 7/2010 | Fallshaw et al. | |
| 2011/0140377 A1 * | 6/2011 | Sullivan | 280/5.32 |
| 2011/0247173 A1 * | 10/2011 | Nguyen et al. | 16/45 |
| 2012/0068423 A1 | 3/2012 | Otterson et al. | |

FOREIGN PATENT DOCUMENTS

| | | | |
|---|---|---|---|
| JP | 8225001 | | 9/1996 |
| JP | 10297206 | | 11/1998 |
| JP | 11020401 | | 1/1999 |
| JP | 11091304 | | 4/1999 |
| JP | 2002234308 | | 8/2002 |
| JP | 2003094906 | | 4/2003 |
| JP | 2006281884 | | 10/2006 |
| JP | 2007230542 | | 9/2007 |
| WO | WO 9001441 | | 2/1990 |
| WO | WO 9840253 A1 * | | 9/1998 |

\* cited by examiner

CASTER WHEEL LIFT AND BRAKE ASSEMBLY

CROSS-REFERENCE TO RELATED APPLICATIONS, IF ANY

This application claims the benefit under 35 U.S.C. §119 (e) of co-pending provisional application Ser. No. 61/657,065, filed 8 Jun. 2011. Application Ser. No. 61/657,065 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to caster wheels and, more particularly, to a brake for caster wheels and, most particularly, to a wheel lift and brake assembly for caster wheels. The description herein is focused on application to wheelchairs, but the invention is applicable to shopping carts, material transport containers, health or other disability-related appliances, and other applications utilizing caster wheels to improve maneuverability.

2. Background Information

Wheel chairs are widely used to contribute to the mobility of persons for whom normal walking is not practical. A number of variations have been made, including various powered and manually propelled devices. Many users of manually powered wheelchairs find it easy to maneuver on flat, hard floors, but have difficulty negotiating over even small obstacles. In wheelchairs, the weight of the user is generally borne on four wheels; the two larger diameter rear drive wheels, and the two smaller caster wheels, typically located in the front. Chair motion is controlled by muscle power applied by grasping the propulsion handrails, thereby inducing forward, reverse, or turning wheelchair motions. The large drive wheels are intended to carry much of the load, while the smaller diameter casters provide sufficient support such that the user is unlikely to tip over forward or backward. Overall structural support is provided by the tubular chair frame.

Casters enable 360-degree rotation of each caster wheel about its vertical spin axis, so that in the absence of obstacles and while operating on level surfaces, the direction taken by the wheelchair is controlled solely by the relative forces applied to the drive wheels by the hand rails. Under ideal conditions, such a wheelchair is extremely maneuverable, since the combination of two front caster wheels and two independently driven rear wheels provide motion in any direction.

However, if an obstacle such as a door threshold or elevation change in an otherwise smooth, level surface is encountered, the situation is more complicated, and the above suspension system is more difficult to use. The navigation problem is composed of two parts: (1) While all wheels require some force to overcome obstacles, small diameter wheels require larger forces to overcome obstacles. The caster wheels typically have much smaller diameters than the larger drive wheels, so as to enable a more compact footprint for the wheelchair, and to permit unfettered turning ability. However, the smaller the castor wheel diameter, the greater the difficulty in overcoming even small obstacles. (2) If an obstacle is disposed such that the caster encounters the obstacle in an oblique or off-center manner, the caster wheel may be forced to turn in an undesired direction, making navigation very difficult or impossible. Both problems are addressed by the current invention: Normal manual wheelchairs are difficult to maneuver over even small obstacles, both for when the obstacle is encountered head on, or even more seriously, obliquely!

The present invention centers on several improvements in the design of manually propelled wheelchairs that are intended to improve their ability to overcome obstacles, such as door thresholds, small changes in elevation, or other deviations from a flat floor. The inventor proposes simple modifications in the design of manual wheelchairs. The three proposed modifications are similar, in that means are provided such that as an obstacle is encountered, the obstacle is detected, and a castor spin axis brake is activated so as to resist caster rotation in the early phase of the encounter. As the obstacle is further encountered, the load is transferred to the caster wheel, the spin axis brake is automatically released, and the mechanism is returned to the starting condition. These three means are designated as "Wheelaids." "Wheelaids" are incorporated into caster wheels. Wheelaids significantly reduce the forces necessary to surmount obstacles without materially changing the maneuverability or ease of operation of wheelchairs so equipped, and add only a little weight. Wheelaids are not intended to allow wheelchairs to negotiate curbs, stairs, or other similar obstacles. Wheelaids can also be applied to powered wheelchairs, potentially resulting in lower motor torque requirements, lighter designs, or longer cruising ranges. Three variations of wheelaids are described below. The first variation utilizes what is called a Wheelcrutch, the second variation utilizes a Secondary Raised Wheel, and the third utilizes what is called a Wheelramp. In the following discussion, the description, "larger" or "smaller," wheel refers to the wheel diameter, not the wheel or tread width.

SUMMARY OF THE INVENTION

The invention is applicable to caster wheels and incorporates a variable pivot and a caster rotational brake. In a preferred embodiment of the invention, the caster wheel assembly having a caster-axis brake and a barrier-traversing member comprises a caster support body having a vertical caster shaft with a shaft axis therein. The vertical caster shaft is pivotally engaged within a caster shaft housing having a stator surface adjacent the caster support body. At least one caster wheel is mounted on a horizontal axle in the caster support body opposite the caster shaft, with the horizontal axle offset from the vertical axis of the caster shaft. At least one barrier-traversing member is biasedly fastened to the caster support body. The barrier-traversing member includes a barrier contact surface adjacent to and aligned in parallel with said caster wheel. The barrier contact surface extends opposite said caster wheel and preferably beyond the vertical axis of the caster shaft. A braking surface member is attached to the barrier contact member opposite the barrier contact surface and adjacent the stator surface of the caster shaft housing. In operation, the moving caster wheel assembly first contacts an obstacle with the barrier contact surface of the barrier-traversing member. The encountered obstacle begins to elevate the barrier-traversing member with little force and easily brings the attached braking surface member into contact with the stator surface of the caster support body, thereby maintaining the orientation of the caster support body and said caster wheel thereof. Then, further forward movement of the directionally restrained caster wheel assembly allows the barrier-traversing member to elevate said caster wheel, transfer the load to the caster wheel, allow the barrier-traversing member to return to it's starting position, and the caster wheel to more easily traverse the obstacle.

In a first embodiment of the invention, the caster wheel assembly includes at least one barrier-traversing member, comprising a planar section termed a "Wheelcrutch," mounted to the caster support body holding the at least one caster wheel. The barrier contact surface of said planar section may deviate from circularity to overcome a greater range of barrier heights. A further feature includes an adjustable-length barrier-traversing member and an adjustable rim portion on the barrier-traversing member, thus permitting operational optimization for the obstacles expected to be experienced.

In a second embodiment of the invention, employing a Secondary Raised Wheel, the caster wheel assembly includes a barrier-traversing member comprising a linear actuation element and the barrier contact surface comprises at least one raised wheel on an axle mounted in the linear actuation element opposite the braking surface member. A further feature includes an adjustable length barrier-traversing member as discussed in the first embodiment, above.

A third embodiment includes a belt member, encircling both the caster wheel and the raised barrier contact wheel described above. This embodiment is termed a "Wheelramp." A further feature includes an adjustable length barrier-traversing member, as discussed in the first and second embodiments above.

DESCRIPTION OF THE EMBODIMENTS

Nomenclature

| | |
|---|---|
| 10 | Caster Wheel Assembly |
| 20 | Caster Support Body |
| 25 | Caster Shaft |
| 30 | Caster Shaft Housing |
| 35 | Stator Surface |
| 40 | Caster Wheel |
| 45 | Axle of Caster Wheel |
| 50 | Barrier-traversing Member |
| 53 | Rigid Planar Body |
| 54 | Dovetail Extension Elements and Locking Knob |
| 55 | Barrier Contact Surface |
| 56 | Adjustable Rim Portion of Barrier-traversing Member |
| 57 | Adjustment Strap and Retaining Bolts |
| 58 | Pivot Pin of Adjustable Rim |
| 60 | Braking Surface Member |
| 65 | First Flexure Member |
| 67 | Flexure Clamp Member |
| 68 | Second Flexure Member |
| 69 | Rigid Connector Plate Member |
| 70 | Linear Actuator Element |
| 75 | Raised Wheel Member of Actuator Element |
| 80 | Axle of Raised Wheel Member |
| 85 | Wheel Ramp Support Member |
| 90 | Wheel Ramp Belt Member |
| 100 | Compound Hinge Assembly |
| 110 | Body of Compound Hinge |
| 115 | Anchor Blocks |
| 120 | Bearing Shafts |
| 125 | Nuts of Bearing Shafts |
| 130 | Delrin Washers |
| A-A | Vertical Axis of Caster Shaft |

Construction

The invention is a caster wheel assembly having an vertical axis brake and barrier-traversing member comprising a caster support body having a caster shaft with a vertical shaft axis therein. The caster shaft is pivotally engaged within a caster shaft housing having a stator surface adjacent the caster support body. At least one caster wheel is mounted on a horizontal axle in the caster support body opposite the caster shaft, with the horizontal axle offset from the vertical axis of the caster shaft. At least one barrier-traversing member is biasedly fastened to the caster support body. The barrier-traversing member includes at least one barrier contact surface adjacent to and aligned in parallel with said caster wheel. The barrier contact surface extends opposite said caster wheel and preferably forward of the vertical axis of the caster shaft. A braking surface member is attached to the barrier contact member opposite the barrier contact surface and adjacent the stator surface of the caster shaft housing. In operation, the moving caster wheel assembly first contacts an obstacle with the barrier contact surface of the barrier-traversing member. The encountered obstacle easily elevates the barrier-traversing member and attached braking surface member into contact with the stator surface of the caster support body, thereby resisting rotation of the caster support body and said caster wheel thereof. Then, further forward movement of said caster wheel assembly allows the barrier-traversing member to elevate said caster wheel, and transfer the load to the said caster wheel, thus allowing the barrier-traversing mechanism to return to its original condition and the caster wheel to more easily traverse the obstacle.

Figure 1:
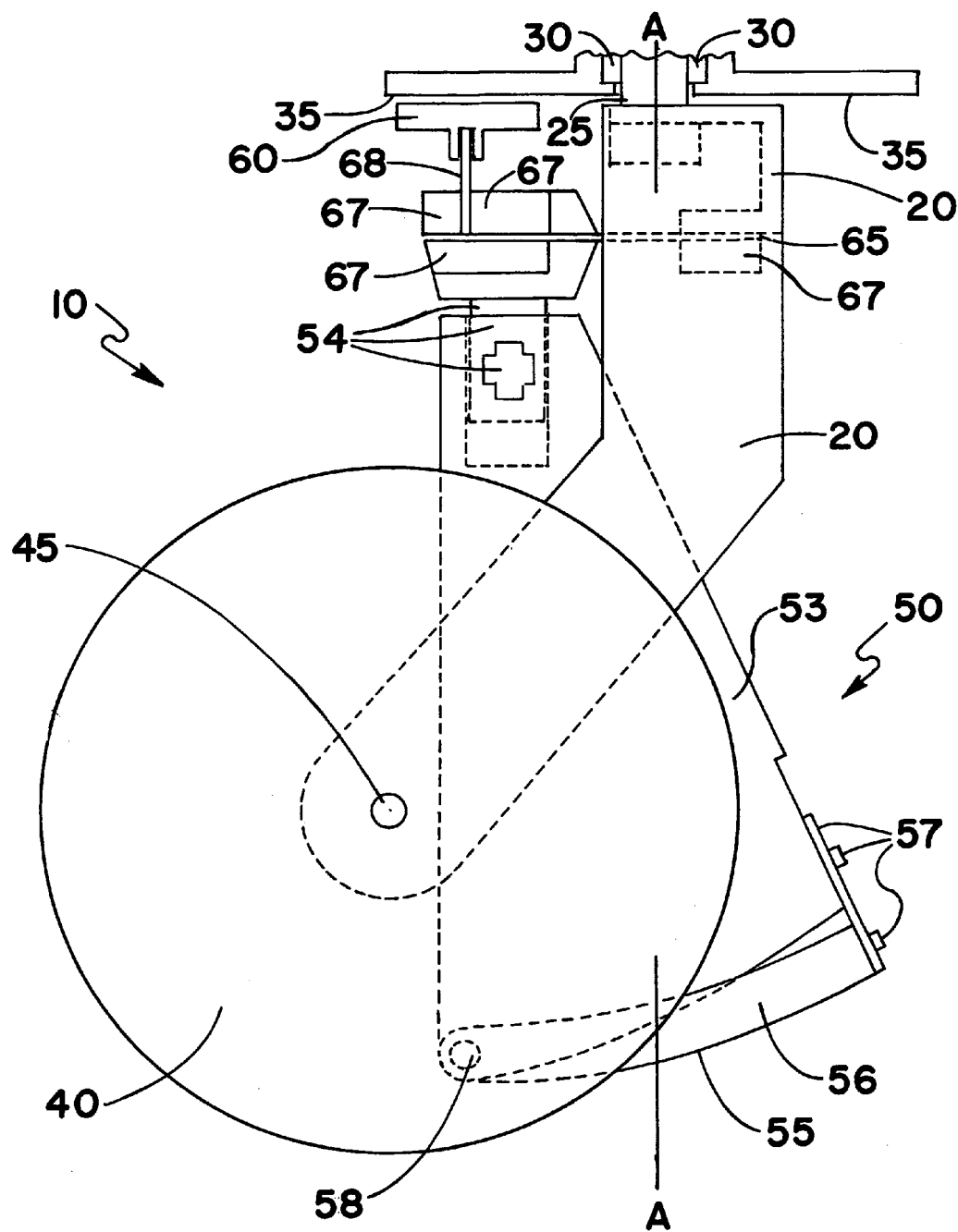
FIG. 1 is a perspective side view of a first embodiment of the caster wheel assembly with a vertical axis brake and barrier-traversing member of the present invention.
Figure 2:
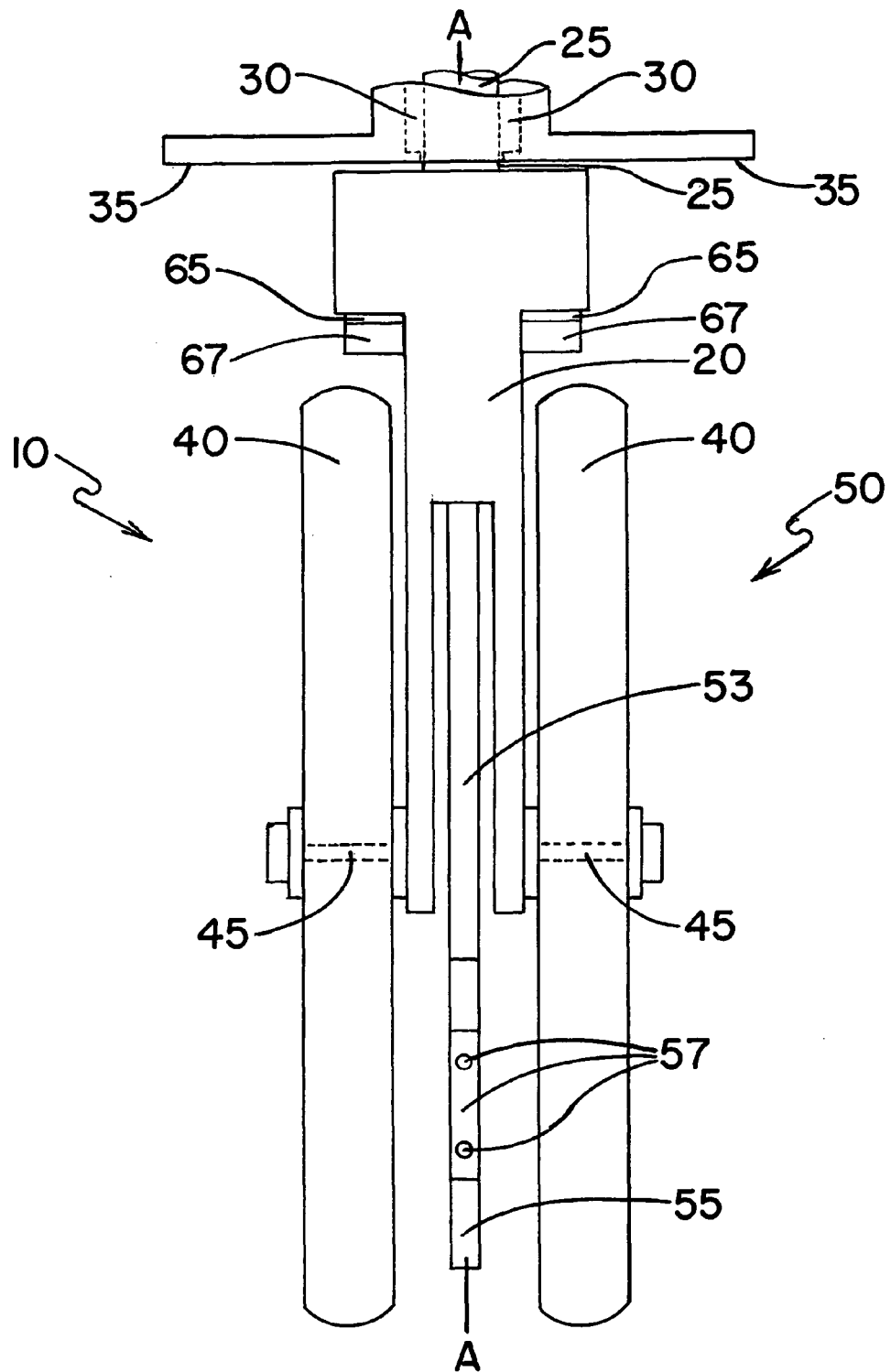
FIG. 2 is a perspective front view of the first embodiment of the caster wheel assembly with a vertical axis brake and barrier-traversing member of the present invention.
Figure 3:
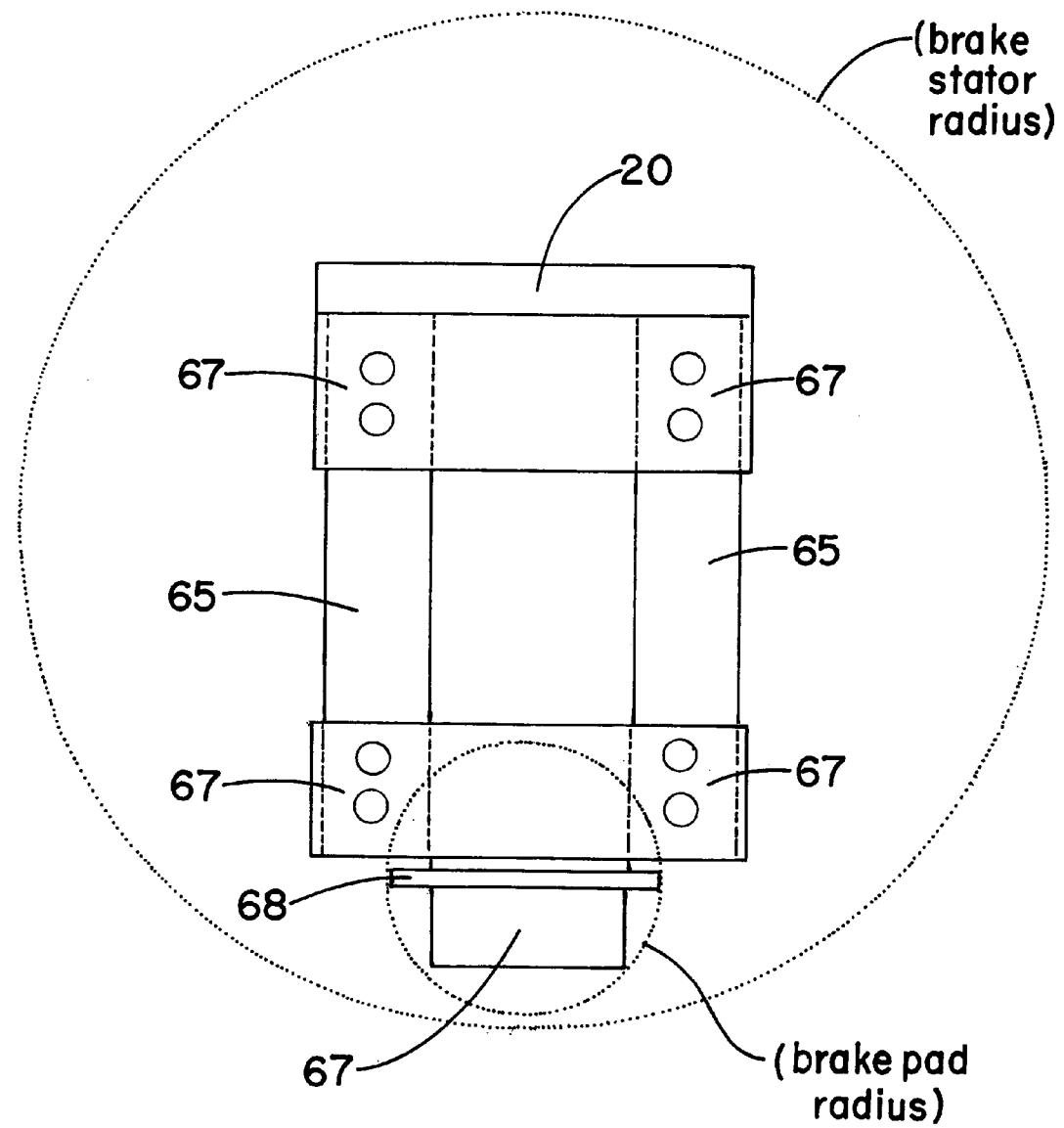
FIG. 3 is top perspective view of the first embodiment of the caster wheel assembly showing a support structure and attachment of the vertical axis brake and barrier-traversing member of the present invention.

Referring now to FIGS. 1-3, several views of a first embodiment (termed the Wheelcrutch) of the caster wheel assembly 10 are shown. The caster wheel assembly 10 includes a caster support body 20 having a caster shaft 25 with a vertical shaft axis A-A therein. The caster shaft 25 is pivotally engaged within a caster shaft housing 30 having a stator surface 35 on the shaft housing 30 adjacent the caster support body 20. Preferably, the stator surface 35 extends radially outward on the surface of the caster shaft housing 20, completely encircling the caster shaft 25. At least one caster wheel 40 is mounted on an axle 45 secured horizontally within the caster support body 20. The axle 45 is positioned opposite the caster shaft 25, and the axle 45 is offset from the axis A-A of the caster shaft 25. The offset of the wheel axle 45 and said caster wheel 40 from the axis A-A of the caster shaft 25 enables the caster wheel 40 and caster support body 20 to easily change direction and follow the movement of the caster shaft 25 within the caster shaft housing 30.

At least one barrier-traversing member 50 is biasedly fastened at an upper end to the caster support body 20 by a first flexure member 65, thereby providing an axis that is parallel to the axle 45. The barrier-traversing member 50 includes a barrier contact surface 55 adjacent to and aligned in parallel with said caster wheel 40. In the embodiment of FIGS. 1-3, the barrier-traversing member 50 includes a rigid, triangle-shaped, planar body 53 with bottom barrier contact surface 55 comprising an arc. The barrier contact surface 55 of said planar body 53 may be circular, or may deviate from circularity to overcome a greater range of barrier heights. The barrier-traversing member 50 is mounted such that the contact surface 55 is always above the surface of the at least one caster wheel 40 contacting the support surface. The barrier contact surface 55 extends opposite the at least one caster wheel 40 and beyond the axis A-A of the caster shaft 25. A braking surface member 60, such as a brake pad, is attached to the upper end of the barrier contact member 50 opposite the barrier contact surface 55 and adjacent the stator surface 35 of the caster shaft housing 30. Preferably the braking surface member 60 is attached to the upper end of the barrier contact member 50 by a second flexure member 68. In the embodiment shown in FIGS. 1-3, the caster wheel assembly 10 includes two caster wheels 40 in register on the caster wheel axle 45. The barrier-traversing member 50 is biasedly fastened at one end to the caster support body 20 and positioned between the two caster wheels 40, best seen in FIG. 2.

Further embodiments of the barrier-traversing member 50 include an adjustable rim 56 for the barrier contact surface 55 of the barrier-traversing member 50. The adjustable rim 56 is pivotally attached to the barrier-traversing member 50 by a pivot pin 58 and fitted with an adjustment strap and retaining bolts 57 to raise or lower the adjustment rim 56 relative to the wheel member 40. Also shown are dovetail extension elements and dovetail locking mechanism 54 securing the barrier-traversing member 50 to the flexure clamp 67 and first flexure member 65, providing further positioning variability for the barrier-traversing member 50.

FIG. 3 is top perspective view of the first embodiment of the caster wheel assembly 10 showing the configuration of the caster support body 20, the flexure clamp 67, the pair of first flexure members 65, the single second flexure member 68, and the top of the barrier-traversing member 50. The radius of the braking surface member 60 and the radius of the brake stator surface 35 are shown in phantom.

In operation, the moving caster wheel assembly 10 first contacts an obstacle with the barrier contact surface 55 of the barrier-traversing member 50 that extends forward of the caster wheel 40, thereby elevating the barrier-traversing member 50 and attached braking surface member 60 into contact with the stator surface 35 of the caster shaft housing 30, and thereby resisting rotation of the caster support body 20 and said caster wheel 40 thereof. Further forward movement of the rotation-restrained caster wheel assembly 10 allows the barrier-traversing member 50 to elevate and transfer the load to said caster wheel 40, enabling the barrier-traversing member 50 (the Wheelcrutch) to return to it's starting position and more easily traverse the obstacle, without diversion of the caster wheel 40 from the direction of travel prior to contact with the obstacle.

Figure 4:
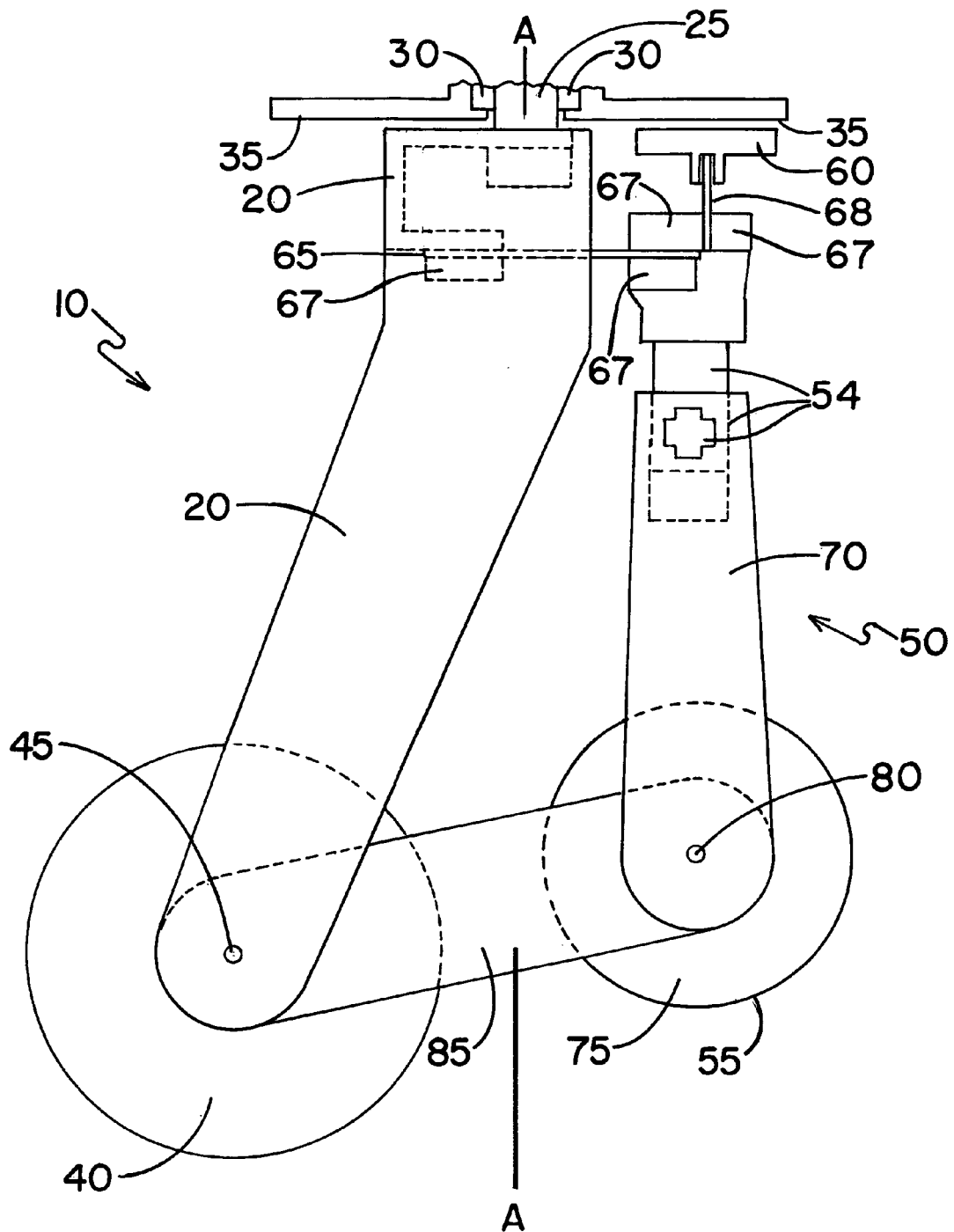
FIG. 4 is a perspective side view of a second embodiment of the caster wheel assembly with a vertical axis brake and barrier-traversing member of the present invention.

Referring now to FIG. 4, a second embodiment of the caster wheel assembly 10 is shown. This embodiment is termed the Secondary Raised Wheel. The second embodiment of the caster wheel assembly 10 includes a caster support body 20 having a caster shaft 25 with a vertical shaft axis A-A therein. The caster shaft 25 is pivotally engaged within a caster shaft housing 30 having a stator surface 35 on the shaft housing 30 adjacent the caster support body 20. Preferably, the stator surface 35 extends radially outward on the surface of the caster shaft housing 20, completely encircling the caster shaft 25. At least one caster wheel 40 is mounted on an axle 45 secured horizontally within the caster support body 20. The axle 45 is positioned opposite the caster shaft 25, and the axle 45 is offset from the axis A-A of the caster shaft 25. The offset of the caster wheel axle 45 and the at least one caster wheel 40 from the axis A-A of the caster shaft 25 enables the caster wheel 40 and caster support body 20 to easily change direction and follow the movement of the caster shaft 25 within the caster shaft housing 30.

A barrier-traversing member 50 is biasedly fastened at an upper end to the caster support body 20 by a first flexure member 65. The barrier-traversing member 50 is positioned opposite said caster wheel 40 and beyond the axis A-A of the caster shaft 25. The barrier-traversing member 50 includes a barrier contact surface 55 adjacent to and aligned in parallel with said caster wheel 40. In the embodiment of FIG. 4, the barrier-traversing member 50 comprises a linear actuation element 70, and the barrier contact surface 55 comprises at least one raised wheel member 75 mounted on a horizontal axle 80 traversing the linear actuation element 70. The low point of the outer barrier contact surface 55 of said raised wheel member 75 is positioned above the low point of the outer surface of said caster wheel member 40, as illustrated. Preferably, the linear actuation element 70 includes extension elements and dovetail locking mechanism 54 that allow variation in the position of the barrier contact surface 55 of said wheel member 75 relative to the surface of said caster wheel 40 contacting the support surface.

A braking surface member 60 is attached to the upper end of the linear actuation element 70 opposite the barrier contact surface 55, in this embodiment the at least one wheel member 75, and adjacent the stator surface 35 of the caster shaft housing 30. Preferably, a braking surface member 60 is attached to the upper end of the linear actuation element 70 by a second flexure member 68. Preferably, a wheel ramp support 85 is pivotally connected between the axle 45 of said caster wheel 40 and the axle 80 of said raised wheel 75 of barrier-traversing member 50.

In operation, the moving caster wheel assembly 10 first contacts an obstacle with the barrier contact surface 55, the raised wheel member 75 of the barrier-traversing member 50, thereby elevating the barrier-traversing member 50, the linear actuator element 70, and attached braking surface member 60 into contact with the stator surface 35 of the caster shaft housing 30, thereby resisting rotation of the caster support body 20 and said caster wheel 40 thereof. Further forward movement of the rotation-resistant caster wheel assembly 10 allows the barrier-traversing member 50 to elevate said caster wheel 40, transferring the load to said caster wheel 40, enabling the barrier-traversing member 50 to return to it's starting position and more easily traverse the obstacle, without diversion of the caster wheel 40 from the direction of travel prior to contact with the obstacle.

Figure 5:
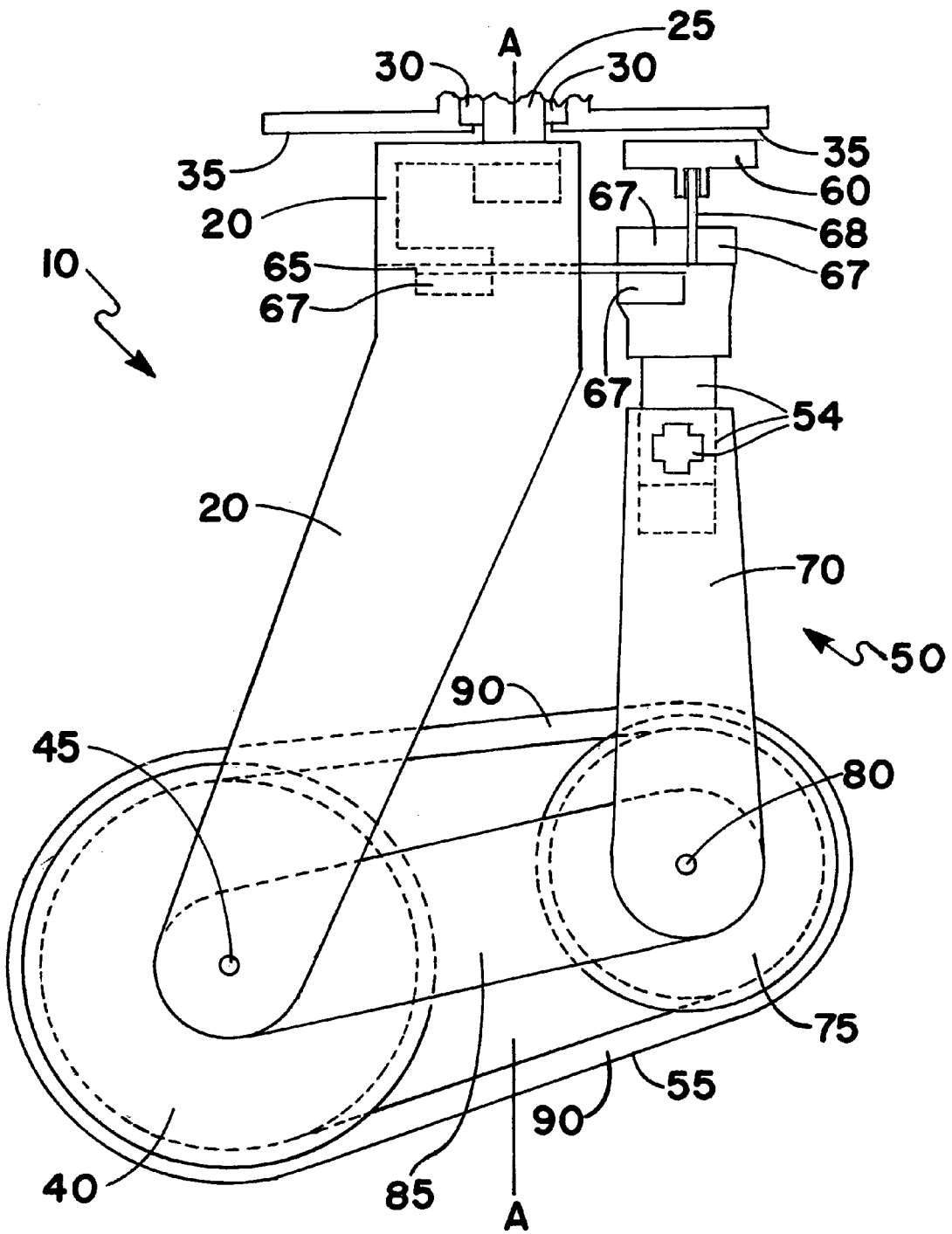
FIG. 5 is a perspective side view of a third embodiment of the caster wheel assembly with a vertical axis brake and barrier-traversing member of the present invention.

Referring now to FIG. 5, a third embodiment of the caster wheel assembly 10, designated as a "Wheelramp," is illustrated. The third embodiment includes all the components of the secondary Raised Wheel embodiment, and further includes a wheelramp belt member 90 encircling both the said caster wheel 40 and said raised wheel member 75 of the linear actuator element 70 to assist in elevating the caster wheel 40 over an obstacle. Preferably, the wheelramp belt member 90 centrally contains a strong but flexible core with both inner and outer polymeric coating. The inner polymeric coating is chosen so as to maintain adequate belt tensioning, while the outer polymeric covering provides enhanced traction when contacting an obstacle.

As in the first and second embodiments of the caster wheel assembly 10, the linear actuator element 70 of the barrier-traversing member 50 includes dovetail extension elements and dovetail locking mechanism 54, to provide adjustable length, or telescoping, of the barrier-traversing member 50. This feature gives further adaptability to the caster wheel assembly 10.

A braking surface member 60 is attached to the upper end of the linear actuation element 70 opposite the barrier contact surface 55, in this embodiment the at least one wheel member 75, and adjacent the stator surface 35 of the caster shaft housing 30. Preferably, a braking surface member 60 is attached to the upper end of the linear actuation element 70 by a second flexure member 68. Preferably, a wheel ramp support 85 is pivotally connected between the axle 45 of said caster wheel 40 and the axle 80 of said raised wheel 75 of barrier-traversing member 50.

In operation, the moving caster wheel assembly 10 first contacts an obstacle with the barrier contact surface 55, the raised wheel member 75 of the barrier-traversing member 50, thereby elevating the barrier-traversing member 50, the linear actuator element 70, and attached braking surface member 60 into contact with the stator surface 35 of the caster shaft housing 30, thereby resisting rotation of the caster support body 20 and said caster wheel 40 thereof. Further forward movement of the rotation-resistant caster wheel assembly 10 allows the barrier-traversing member 50 to elevate said caster wheel 40, transferring the load to said caster wheel 40, enabling the barrier-traversing member 50 to return to it's starting position and more easily traverse the obstacle, without diversion of the caster wheel 40 from the direction of travel prior to contact with the obstacle.

In a further embodiment, the three disclosed embodiments of the caster wheel assembly 10 each include a stop mechanism (not shown) to limit downward movement of the barrier-traversing member 50. The barrier-traversing member 50, biasedly fastened at an upper end to the caster support body 20 by a first flexure member 65, includes a stop mechanism (not shown) to limit downward movement of the barrier-traversing member 50, once the barrier contact surface 55 thereof moves out of contact with the encountered obstacle.

Figure 6:
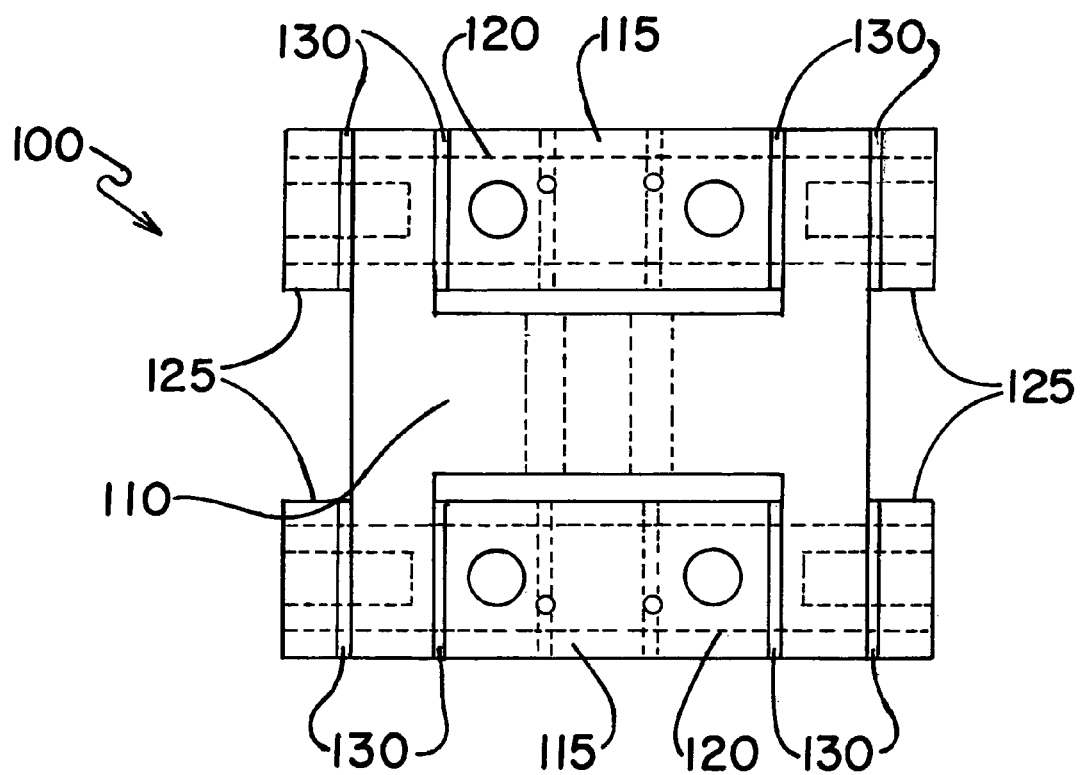
FIG. 6 is a top perspective view of an alternative embodiment of the support structure and attachment of the first embodiment of the caster wheel assembly with a vertical axis brake and barrier-traversing member of the present invention. This alternative arrangement is termed a compound hinge.

FIG. 6 provides an alternative structure, termed a Compound Hinge, for attaching the barrier-traversing member 50 to the caster support body 20. The structure of the compound hinge assembly 100 provides additional lateral rigidity and thus, additional resistance to lateral deflection of the barrier-traversing member 50 to externally applied loads. The resulting lateral rigidity reduces the need for including additional deflection-limiting elements for this embodiment.

The compound hinge assembly 100 includes a body 110 with a pair of opposed anchor blocks 115 secured thereto. A bearing shaft 120 extends through the body 110 adjacent each anchor block 115 with a washer 130 and nut 125 secured at each end of each bearing shaft 120.

Figure 7:
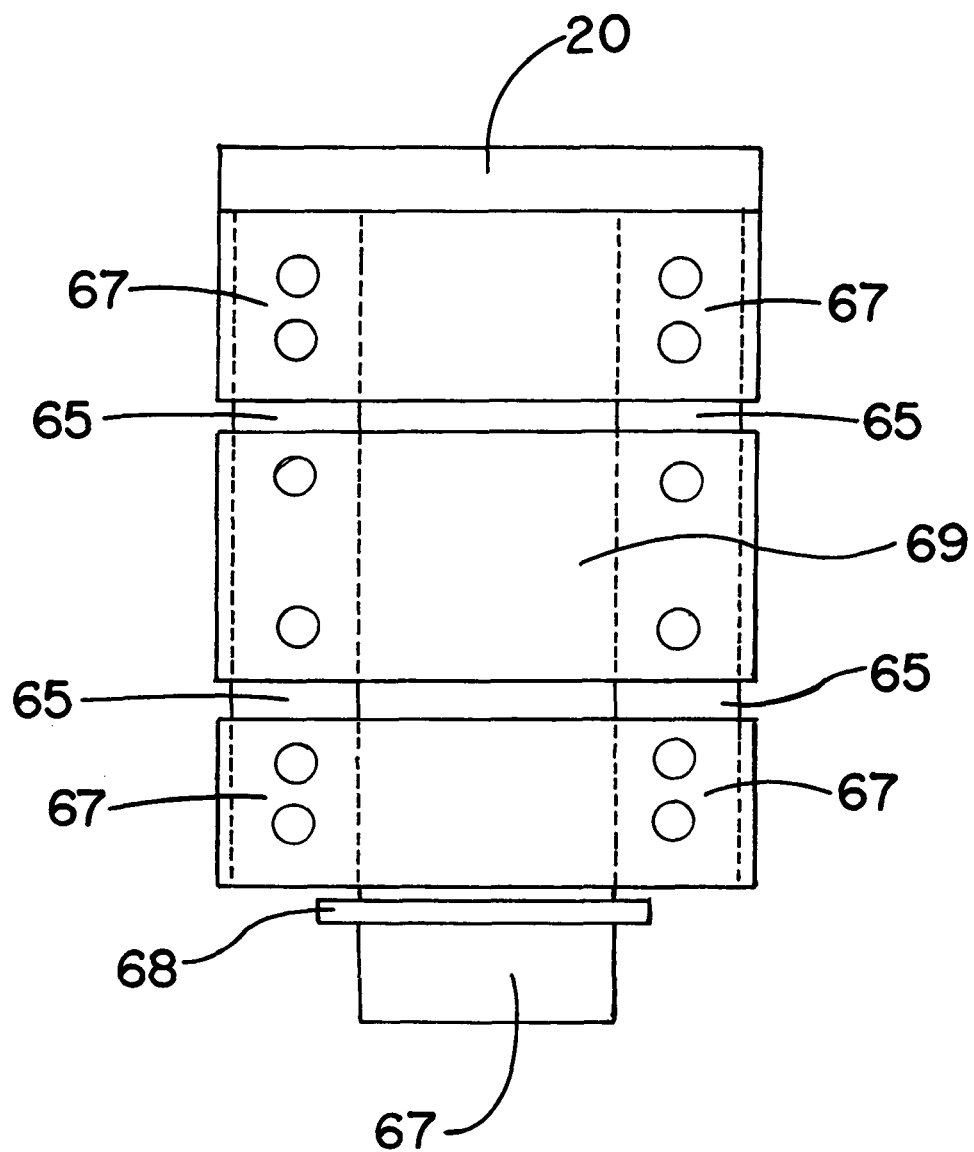
FIG. 7 is a top perspective view of another alternative embodiment of the support structure and attachment of the first embodiment of the caster wheel assembly with a vertical axis brake and barrier-traversing member of the present invention.

FIG. 7 provides another alternative structure for the flexure clamp member 67 that attaches the barrier-traversing member 50 to the caster support body 20. The structure of this flexure clamp member 67 provides additional lateral rigidity and thus, additional resistance to lateral deflection of the barrier-traversing member 50 to externally applied loads. The resulting lateral rigidity also reduces the need for including additional deflection-limiting elements for this embodiment.

The flexure clamp member 67 includes two pairs of first flexure members 65 each secured to a rigid connector plate member 69 positioned between the caster support body 20 and the barrier-traversing member 50. The length of the first flexure members 65 in this embodiment is significantly shorter than those of the embodiment shown in FIGS. 1 and 3. This provides additional lateral rigidity to lateral deflection of the barrier-traversing member 50 to externally applied loads.

While the invention has been particularly shown and described with reference to preferred embodiments thereof, it will be understood by those skilled in the art that various changes in form and details may be made therein without departing from the spirit and scope of the invention.

I claim:

1. A caster wheel assembly having a vertical axis brake and barrier-traversing member comprising:
    a caster support body having a caster shaft with a vertical shaft axis therein, the caster shaft rotationally engaged within a caster shaft housing having a fixed stator surface adjacent the caster support body;
    at least one caster wheel mounted on a horizontal axle in the caster support body a selected distance from the vertical shaft axis of the caster shaft, the horizontal axle offset rearward from the vertical shaft axis of the caster shaft;
    at least one a barrier-traversing member flexibly fastened to the caster support body, the at least one barrier-traversing member including a barrier contact surface adjacent to and parallel with the at least one caster wheel, the barrier contact surface extending below the horizontal axle of the at least one caster wheel and forward of the vertical shaft axis of the caster support body; and
    a braking surface member attached to the at least one barrier-traversing member at an end thereof opposite the barrier contact surface and adjacent the fixed stator surface of the caster shaft housing with a gap there between;
    whereby the moving caster wheel assembly first contacts an obstacle with the barrier contact surface of the at least one barrier-traversing member, thereby elevating the barrier-traversing member and attached braking surface member into contact with the fixed stator surface of the caster shaft housing, thereby restraining rotation of the caster wheel assembly and the at least one caster wheel thereof; the at least one barrier-traversing member elevating the rotation-restrained caster wheel assembly onto the obstacle; and
    then further forward motion transferring load to said at least one caster wheel, thereby separating the braking surface member and fixed stator surface, and thereby allowing the at least one barrier-traversing member to return to it's starting position.

2. The caster wheel assembly having a vertical axis brake and barrier-traversing member of claim 1, wherein the at least one barrier-traversing member comprises a planar, triangle-shaped section with a barrier contact surface that is curved.

3. The caster wheel assembly having a vertical axis brake and barrier-traversing member of claim 2, wherein the curved barrier contact surface of the planar, triangle-shaped section includes a pivotally adjustable rim portion to vary the curved barrier contact surface elevation thereof.

4. The caster wheel assembly having a vertical axis brake and barrier-traversing member of claim 2, wherein the caster wheel assembly includes two caster wheels each on a horizontal axle with a common axis, the at least one barrier-traversing member positioned between the two caster wheels.

5. The caster wheel assembly having a vertical axis brake and barrier-traversing member of claim 1, wherein the at least one barrier-traversing member is flexibly fastened to the caster support body by a flexure member, thereby biasing the attached braking surface away from the stator surface, providing a gap there between in the absence of an encountered obstacle.

6. The caster wheel assembly having a vertical axis brake and barrier-traversing member of claim 1, wherein the barrier-traversing member is flexibly fastened to the caster support body by a compound hinge assembly, thereby biasing the attached braking surface away from the fixed stator surface, providing a gap there between in the absence of an encountered obstacle.

7. The caster wheel assembly having a vertical axis brake and barrier-traversing member of claim 1, wherein the barrier-traversing member comprises a linear actuation element and the barrier contact surface comprises at least one wheel on a second horizontal axle forward of the at least one caster wheel and attached to the linear actuation element at an end thereof opposite the braking surface member.

8. The caster wheel assembly having a vertical axis brake and barrier-traversing member of claim 7, wherein the linear actuation element includes a dovetail extension and locking mechanism providing selectively variable length thereto.

9. The caster wheel assembly having a vertical axis brake and barrier-traversing member of claim 7, further including a wheelramp support connected between the horizontal axle of the at least one caster wheel and the second horizontal axle of the at least one wheel of the barrier-traversing member.

10. The caster wheel assembly having a vertical axis brake and barrier-traversing member of claim 9, further including a wheelramp belt member encircling the at least one caster wheel and encircling the at least one wheel of the barrier-traversing member, the wheelramp belt member comprising a portion of the barrier contact surface and assisting elevation of the at least one caster wheel over an obstacle.

11. The caster wheel assembly having a vertical axis brake and barrier-traversing member of claim 1, wherein the fixed stator surface extends radially outward on a surface of the caster shaft housing and surrounds the caster shaft engaged there within.

12. A caster wheel assembly having a vertical axis brake and barrier-traversing member comprising:
a caster support body having a caster shaft with a vertical shaft axis therein, the caster shaft rotationally engaged within a caster shaft housing having a fixed stator surface adjacent the caster support body;
at least one caster wheel mounted on a horizontal axle in the caster support body a selected distance from the vertical shaft axis of the caster shaft, the horizontal axle offset rearward from the vertical shaft axis of the caster shaft;
at least one a barrier-traversing member flexibly fastened to the caster support body, the at least one barrier-traversing member comprising a planar, triangle-shaped section with a barrier contact surface that is curved and positioned adjacent to and parallel with the at least one caster wheel, the barrier contact surface extending below the axle of the at least one caster wheel and forward of the vertical shaft axis of the caster support body; and
a braking surface member attached to the barrier-traversing member at an end thereof opposite the barrier contact surface and adjacent the fixed stator surface of the caster shaft housing with a gap there between;
whereby the moving caster wheel assembly first contacts an obstacle with the barrier contact surface of the at least one barrier-traversing member, thereby elevating the barrier-traversing member and attached braking surface member into contact with the fixed stator surface of the caster shaft housing, thereby restraining rotation of the caster wheel assembly and the at least one caster wheel thereof; the at least one barrier-traversing member elevating the rotation-restrained caster wheel assembly onto the obstacle; and
then further forward motion transferring load to said at least one caster wheel, thereby separating the braking surface member and fixed stator surface, and thereby allowing the at least one barrier-traversing member to return to it's starting position.

13. The caster wheel assembly having a vertical axis brake and barrier-traversing member of claim 12, wherein the curved barrier contact surface of the planar, triangle-shaped section further includes a pivotally adjustable rim portion to vary the curved barrier contact surface elevation thereof.

14. The caster wheel assembly having a vertical axis brake and barrier-traversing member of claim 12, wherein the caster wheel assembly includes a plurality of caster wheels each on a horizontal axle with a common axis, at least one barrier-traversing member positioned between at least one pair of adjacent caster wheels.

15. The caster wheel assembly having a vertical axis brake and barrier-traversing member of claim 12, wherein the at least one barrier-traversing member is flexibly fastened to the caster support body by a flexure member, thereby biasing the attached braking surface away from the fixed stator surface, providing a gap there between in the absence of an encountered obstacle.

16. A caster wheel assembly having a vertical axis brake and barrier-traversing member comprising:
a caster support body having a caster shaft with a vertical shaft axis therein, the caster shaft rotationally engaged within a caster shaft housing having a fixed stator surface adjacent the caster support body;
at least one caster wheel mounted on a horizontal axle in the caster support body a selected distance from the vertical shaft axis of the caster shaft, the horizontal axle offset rearward from the vertical shaft axis of the caster support body;
at least one barrier-traversing member flexibly fastened to the caster support body, the at least one barrier-traversing member including a barrier contact surface adjacent to and parallel with the at least one caster wheel, the barrier contact surface extending below the axle of the at least one caster wheel and forward of the vertical shaft axis of the caster shaft, the barrier-traversing member comprising a linear actuation element and the barrier contact surface comprising at least one wheel on a second horizontal axle forward of at least one the caster wheel and attached to the linear actuation element at an end thereof adjacent the at least one caster wheel; and a braking surface member attached to the barrier-traversing member at an end thereof opposite the barrier contact surface and adjacent the fixed stator surface of the caster shaft housing with a gap there between;

whereby the moving caster wheel assembly first contacts an obstacle with the barrier contact surface of the at least one barrier-traversing member, thereby elevating the barrier-traversing member and attached braking surface member into contact with the fixed stator surface of the caster shaft housing, thereby restraining rotation of the caster wheel assembly and the at least one caster wheel thereof; the at least one barrier-traversing member elevating the rotation-restrained caster wheel assembly onto the obstacle; and then further forward motion transferring load to said at least one caster wheel, thereby separating the braking surface member and fixed stator surface, and thereby allowing the at least one barrier-traversing member to return to it's starting position.

17. The caster wheel assembly having a vertical axis brake and barrier-traversing member of claim 16, wherein the linear actuation element includes a dovetail extension and locking mechanism providing selectively variable length thereto.

18. The caster wheel assembly having a vertical axis brake and barrier-traversing member of claim 16, further including a wheelramp support member connected between the horizontal axle of the at least one caster wheel and the second horizontal axle of the at least one wheel of the barrier-traversing member.

19. The caster wheel assembly having a vertical axis brake and barrier-traversing member of claim 18, further including a wheelramp belt member encircling the at least one caster wheel and encircling the at least one wheel of the barrier-traversing member, the wheelramp belt member comprising a portion of the barrier contact surface and assisting elevation of the at least one caster wheel onto an obstacle.

20. The caster wheel assembly having a vertical axis brake and barrier-traversing member of claim 16, wherein the fixed stator surface extends radially outward on a surface of the caster shaft housing and surrounds the caster shaft engaged there within.

\* \* \* \* \*